(12) United States Patent
Duffield et al.

(10) Patent No.: US 7,219,484 B2
(45) Date of Patent: May 22, 2007

(54) PROCESS FOR PREPARING A LAMINATED, THERMOFORMED FILM

(75) Inventors: Paul John Duffield, Beverley (GB); Geoffrey Robert Hammond, Hull (GB)

(73) Assignee: Reckitt Benckiser (UK) Limited, Slough, Berkshire (GB)

( * ) Notice: Subject to any disclaimer, the term of this patent is extended or adjusted under 35 U.S.C. 154(b) by 60 days.

(21) Appl. No.: 10/470,315

(22) PCT Filed: Jan. 24, 2002

(86) PCT No.: PCT/GB02/00324

§ 371 (c)(1),
(2), (4) Date: Jan. 16, 2004

(87) PCT Pub. No.: WO02/058910

PCT Pub. Date: Aug. 1, 2002

(65) Prior Publication Data

US 2005/0056364 A1    Mar. 17, 2005

(30) Foreign Application Priority Data

Jan. 26, 2001    (GB) ................................ 0102077.5
Jan. 26, 2001    (GB) ................................ 0102079.1

(51) Int. Cl.
B65B 47/00    (2006.01)

(52) U.S. Cl. .............. 53/453; 156/244.24; 156/244.26; 156/244.27; 53/456; 53/467

(58) Field of Classification Search ........... 156/244.11, 156/244.27, 244.24, 285
See application file for complete search history.

(56) References Cited

U.S. PATENT DOCUMENTS

| 3,924,051 A | 12/1975 | Wiggins et al. ............. 428/520 |
|---|---|---|
| 4,547,427 A | 10/1985 | Engelsberger ............... 428/520 |
| 4,942,012 A | 7/1990 | Lee et al. .................... 264/510 |
| 5,280,835 A | 1/1994 | Edwards et al. ............. 206/484 |
| 5,632,133 A | 5/1997 | Wyslotsky .................... 53/433 |
| 5,665,824 A | 9/1997 | Chang et al. ................ 525/185 |
| 5,760,118 A | 6/1998 | Sinclair et al. ............. 524/306 |
| 5,786,092 A | 7/1998 | Lorenzo et al. .......... 428/423.1 |
| 6,162,318 A | 12/2000 | Planeta et al. ......... 156/244.27 |
| 6,303,553 B1 | 10/2001 | Gorlin ......................... 510/226 |

FOREIGN PATENT DOCUMENTS

| DE | 1 479 159 | 12/1974 |
|---|---|---|
| EP | 0 150 979 A2 | 1/1985 |
| EP | 0 513 692 A1 | 5/1992 |
| EP | 0 514 172 A1 | 5/1992 |
| EP | 0 769 369 A2 | 4/1997 |
| GB | 1 116 739 | 10/1966 |
| GB | 1 074 317 | 7/1967 |
| GB | 1 214 656 | 12/1967 |
| GB | 2 244 258 A | 11/1991 |
| WO | 94/29104 | 12/1994 |
| WO | 94 29188 | 12/1994 |
| WO | 95/15249 | 6/1995 |
| WO | 95/25625 | 9/1995 |
| WO | 97 10095 | 3/1997 |
| WO | 01/66082 A2 | 9/2001 |

*Primary Examiner*—Richard Crispino
*Assistant Examiner*—Barbara J. Musser
(74) *Attorney, Agent, or Firm*—Norris McLaughlin & Marcus, PA

(57) ABSTRACT

A process for preparing a laminated, thermoformed film which comprises:
a. blowing a film-forming composition to form a bubble;
b. collapsing the bubble to form a film stack comprising a plurality of layers; and
c. heating said film stack in a mould to thermoform said film stack and to adhere the layers together.

9 Claims, No Drawings

PROCESS FOR PREPARING A LAMINATED, THERMOFORMED FILM

The present invention relates to thermoformed films and containers, in particular to a process for producing laminated, thermoformed films and containers comprising laminated, thermoformed films.

Laminated films are known to be suitable for use in packaging. In certain instances it may be advantageous to use a laminate of two films. For example, GB-A-2,244,258 teaches that a laminated film may be used to package a hazardous chemical dissolved or dispersed in a liquid or gel. While a single film may have pinholes, the two films in a laminate are unlikely to have pinholes which coincide. Thus the risk of leakage is reduced by using a laminated film. According to GB-A-2,244,258 the layers of the laminated film are desirably made by different techniques such as extrusion or casting, since films made by different methods may have advantageous properties. However, laminated films produced using different techniques have the disadvantage that they are expensive to produce.

When using a film for packaging purposes, it may be appropriate to use a reasonably thick film, particularly when the film is thermoformed because the thickness of the film is reduced in places during the thermoforming process. However, it is difficult to produce such a film by the standard blowing or casting process. Films produced by these processes lack at least one of uniform thickness, moisture content and consistency, and may also have a large proportion of fish eyes.

It would be desirable to have a process for preparing a film having a desired thickness which is uniform and consistent, and which does not have a large proportion of fish eyes, regardless of its thickness.

The present invention provides a process for preparing a laminated, thermoformed film which comprises:
   a. blowing a film-forming composition to form a bubble;
   b. collapsing the bubble to form a film stack comprising a plurality of layers; and
   c. heating said film stack in a mould to thermoform said film stack and to adhere the layers together.

The process of the present invention allows for the production of a thermoformed, laminated film in one step from a film stack or from a film-forming composition. This avoids the use of an additional step using heating or adhesive, along with pressure or a vacuum, to laminate the films. This reduces capital expenditure and other costs, as well as reducing complexity and production time, as compared with the known processes, while still providing the benefits previously ascribed to laminated films. It is also possible to use relatively simple blowing and thermoforming apparatus.

The present invention produces a film by a standard blowing technique, which is well known to those skilled in the art. However, in the prior art, the bubble is cut and opened to produce a single layer of film. Steps are usually taken to ensure that the inside surfaces of the bubble do not stick to each other, for example by introducing a small amount of starch such as maize starch, talc or magnesium stearate inside the bubble. In contrast, in the present invention, the film is collapsed to form a flattened bubble with the sides of the flattened bubble resting on each other to form a film stack (known as a "lay flat"). The film stack may optionally be passed through nip rollers to ensure the stack does not immediately fall apart. Usually the film stack will consist of two layers, but if the bubble is folded appropriately, the film stack may consist of more than two layers, for example four or six layers. The sides of the collapsed bubble may be trimmed off, or left on if they do not interfere with the further processing of the film stack. Because the film stack is produced from a collapsed bubble, the layers are identical to each other, having the same composition. Each film layer may be unorientated, mono-axially oriented or bi-axially oriented. The layers in the stack usually also have the same orientation, although their planes of orientation may be different depending on the folding of the bubble when it is collapsed.

Generally a single composition is used to form the bubble. However, two or more compositions may be co-extruded, in which case each layer in the film stack will itself be a laminate.

The film stack is then heated during a thermoforming process to adhere the layers to each other to form a laminated, thermoformed film. The film stack may be stored and laminated at a later time. The film stack may also be heated and laminated immediately after the film stock is formed. In particular the bubble can be formed, collapsed, for example by pinch rollers, and immediately fed into a thermoforming machine. Such a process has the advantage that a separate heating step is not required to form the laminated film. Instead the laminated film is formed during one of the necessary steps in a thermoforming process. For example, the laminate may be formed by the action of heat and pressure or vacuum from the heating plate or the forming mould, or a combination of the two, during a thermoforming process. It is, however, desirable for the lamination to occur while the film stack is being drawn down or blown down into the mould. Thus, for example, the film stack is heated to a thermoforming temperature using a normal thermoforming heater plate assembly and then drawn down under vacuum or blown down under pressure into the mould. The thermoforming temperature, pressure or vacuum and dwell time depend on the polymer or mixture of polymers being used.

A suitable forming temperature for PVOH or ethoxylated PVOH is, for example, from 90 to 130° C., especially 90 to 120° C.

A suitable forming pressure is, for example, 60 to 138 kPa (10 to 20 p.s.i.), especially 69 to 103 kPa (10 to 15 p.s.i.). A suitable forming vacuum is 0 to 4 kPa (0 to 20 mbar), especially 0 to 2 kPa (0 to 20 mbar). A suitable dwell time is, for example, 0.4 to 2.5 seconds, especially 2 to 2.5 seconds.

One skilled in the art can choose an appropriate temperature, pressure or vacuum and dwell time to achieve a laminate of the desired integrity. The amount of vacuum or pressure used depends on the thickness and porosity of the film. While desirably conditions are chosen within the above ranges, it is possible to use one or more these parameters outside the above ranges, although it may be necessary to compensate by changing the values of the other two parameters.

The thickness of each film layer in the film stack is preferably 20 to 125 μm, more preferably 20 to 80 μm, especially 25 to 75 μm. The thickness of the film stack is preferably 40 to 250 μm, more preferably 40 to 160 μm, especially 50 to 150 μm.

When the film stack is thermoformed in such a way that thinning may occur, the thickness of each film layer is preferably 50 to 75 μm, especially 60 to 75 μm, and the thickness of the film stack is preferably 100 to 150 μm, especially 120 to 150 μm. This is especially the case when thermoforming and simultaneously laminating to produce a container by the process of the present invention. When the film stack is not further processed in such a way, the thickness of each film layer is preferably 20 to 40 μm, especially 25 to 30 μm, and the thickness of the film stack is preferably 40 to 80 μm, especially 50 to 60 μm. This is especially the case when preparing a film placed on top of the filled pocket to produce a container by the process of the present invention.

If it is desired to produce a water-soluble laminated film, each of the layers should be water-soluble. Examples of water-soluble polymers are poly(vinyl alcohol) (PVOH) and cellulose derivatives such as hydroxypropyl methyl cellulose (HPMC). The PVOH may be partially or fully alcoholised or hydrolysed. For example it may from 40 to 100%, preferably 70 to 92%, more preferably about 88% alcoholised or hydrolysed. The degree of hydrolysis is known to influence the temperature at which the PVOH starts to dissolve in water. Ethoxylated PVOH may also be used.

The present invention also provides a process for producing a container containing a composition, which comprises:
  a. blowing a film-forming composition to form a bubble;
  b. collapsing the bubble to form a film stack comprising a plurality of layers;
  c. thermoforming and simultaneously laminating the film stack to produce a pocket;
  d. filling the pocket with the composition;
  e. placing a film on top of the filled pocket; and
  f. sealing the films together.

The container may be insoluble in water, but is desirably water soluble so that is can simply be added to an aqueous environment where it will dissolve to release its contents. The film-forming composition and the film placed on top of the filled pocket are therefore both desirably water-soluble. They may be formed from identical or different compositions. Desirably at least one, and preferably both, are formed from PVOH. The PVOH may be partially or fully alcoholised or hydrolysed. For example, it may be from 40 to 100%, preferably 70 to 92%, more preferably about 88%, alcoholised or hydrolysed. Ethoxylated PVOH may be used. If desired, the PVOH film may be substantially anhydrous, for example having a water content of less than 5 wt %.

The composition may be a solid. For example, it may be a particulate or granulated solid, or a tablet. It may also be a liquid, which may be thickened or gelled if desired. The liquid composition may be non-aqueous or aqueous, for example comprising less than or more than 5% water. The composition may have one or more than one phase. For example it may comprise an aqueous composition and a liquid composition which is immiscible in the aqueous composition. It may also comprise a liquid composition and a separate solid composition, for example in the form of a ball, pill or speckles.

The composition may be any composition which is intended to be released in an aqueous environment if the container is water-soluble. Thus, for example, it may be an agrochemical composition such as a plant protection agent, for instance a pesticide such as an insecticide, fungicide, herbicide, acaricide or nematocide, a plant growth regulator or a plant nutrient. Such compositions are generally packaged in amounts of 0.1 g to 7 kg, preferably 1 kg to 5 kg, when in solid form. When in liquid or gelled form, such compositions are generally packaged in amounts of from 1 ml to 10 litres, preferably 0.1 to 6 litres, especially form 0.5 to 1.5 litres. The composition may also be a dishwashing, water-softening, laundry or detergent composition, or a rinse-aid. Such compositions may be suitable for use in a domestic washing machine. The composition may also be a disinfectant, antibacterial or antiseptic composition, or a refill composition for a trigger-type spray. Such compositions are generally packaged in amounts of from 5 to 100 g, especially from 15 to 40 g. For example, a dishwashing composition may weigh from 15 to 20 g, a water-softening composition may weigh from 25 to 35 g, and a laundry composition may weigh from 30 to 40 g.

The film placed on top of the filled pocket need not be laminated. It may, for example, be a single-layered film. Desirably, however, it is also laminated to reduce the possibility of pinholes allowing leakage through the film. The film may be pre-laminated, or may be laminated during step (c) or (d). Thus, for example, it may be laminated simply by the action of the heat inside the thermoforming machine before or during the step of placing the film on top of the filled pocket. It may also be laminated during the step when the films are sealed together to enclose fully the composition, if heat sealing is used. Lamination may occur by the heat from the heating platen and/or the pressure applied through the sealing head. The films may be separately introduced into the thermoforming machines on two or more rollers, and the laminate formed inside the machine. The roller(s) are preferably driven to control the film tension. When the films are brought together it is preferred to press them together before lamination to exclude air from between the films that would otherwise interfere with the lamination process. For example, the films may be passed through a set of pinch rollers.

The covering film desirably has a thickness which is less than that of the film stack because it will not generally be thermoformed so localised thinning of the sheet will not occur. It desirably has a thickness which is less than that of the film stack because it will not generally be thermoformed so localised thinning of the sheet will not occur. The thickness of the film will generally be from 20 to 160 μm, preferably from 20 to 100 μm, especially 40 to 70 μm, more especially 50 to 60 μm.

The films may be sealed together by any suitable means, for example by means of an adhesive or by heat sealing.

A suitable sealing temperature is, for example, 120 to 195° C., for example 140 to 150° C. A suitable sealing pressure is, for example from 250 to 600 kPa. Examples of sealing pressures are 276 to 414 kPa (40 to 60 p.s.i.) or 400 to 600 kPa (4 to 6 mbar). Suitable sealing dwell times are 0.4 to 2.5 seconds.

One skilled in the art can use an appropriate temperature, pressure and dwell time to achieve a seal of the desired integrity. While desirably conditions are chosen within the above ranges, it is possible to use one or more of these parameters outside the above ranges, although it may be necessary to compensate by changing the values of the other two parameters.

The containers produced by the process of the present invention have the advantage discussed of reduced risk of leakage by pinholes. Furthermore, it has been found that water-soluble containers stored in an environment where water damage may occur have further advantages. For example, containers containing detergents or other household products are often stored under the sink, where water may drip or flood. Furthermore droplets of water may contact the containers if they are picked up by a person with wet hands. If the outside of the container is moistened, the containers will tend to stick to each other. If the container is formed from a monolayered film, the film material will rupture when the containers are separated. It has now been surprisingly discovered that the use of a laminated film reduces or can even eliminate this risk. Though the layers of the film are laminated together, only the outer layer will rupture when two container which are sticking together are separated. Thus the container will still fully enclose the composition, which will not leak out.

The present invention is further explained in the following Examples:

EXAMPLE 1

Production of Dishwashing Containers

A PVOH homopolymer, Aquafilm L337D, obtained from Aquafilm Limited, was extruded and blown to form a bubble having a film thickness of 75 µm. The film was then collapsed and laid flat without cutting the film to produce two layers, each having a thickness of 75 µm, lying on top of each other such that the total thickness was 150 µm. The two layers were then thermoformed in a mould to produce small pockets using a Tiromat 470 thermoforming machine with a forming temperature of 115 to 125° C. under normal vacuum conditions of 2 kPa (20 mbar) with a dwell time of 2 seconds. This thermoforming step also laminated the two films together such that they could not be separated by peeling them apart.

The pockets produced were filled with a dishwashing gel composition. A second film consisting of a similar flattened bubble of Aquafilm L337D, except that each layer had a thickness of 25 µm producing a total thickness of 50 µm, was placed on top of the filled pockets and sealed at a temperature setting of 140 to 150° C. at a normal sealing pressure of 600 kPa (6 bar) acting through 220 mm pistons. The heater plate used during the heat sealing softens the two films and the pressure applied by the sealing assembly pushes the films together to laminate them.

EXAMPLE 2

Production of Dishwashing Containers

The first part of Example 1 was repeated except that the thermoforming temperature was 115 to 118° C. After the pockets had been filled with the dishwashing gel composition, a 75 µm thick single-layered cast film of Monosol M8534 copolymer was placed on top of the pockets, and the films sealed together at a temperature setting of 140 to 150° C. at normal sealing pressure of 600 kPa (6 bar) acting through 220 mm pistons with a dwell time of 2.5 seconds.

EXAMPLE 3

Production of Laundry Containers

A PVOH homopolymer, Aquafilm LX7D, obtained from Aquafilm Limited, was extruded and blown to form a bubble having a film thickness of 60 µm. The film was then collapsed and laid flat without cutting the film to produce two layers, each having a thickness of 60 µm, lying on top of each other such that the total thickness was 120 µm. The two layers were then thermoformed in a mould to produce small pockets using a Doyen MT 2500 thermoforming machine with a forming temperature of 115 to 120° C. under normal pressure conditions of 69 to 103 kPa (10 to 15 p.s.i.) and a dwell time of 2 seconds. This thermoforming step also laminated the two films together such that they could not be separated by peeling them apart.

The formed pockets were filled with a liquid laundry composition and a 75 µm thick single-layered cast film of Monosol M8534 copolymer was placed on top of the pockets. The films were sealed together at a temperature of 165° C. using a sealing pressure of 352 kPa (51 p.s.i.) and a dwell time of 1.5 seconds.

EXAMPLE 4

Production of Laundry Containers

The first part of Example 3 was repeated except that the film had a total thickness of 150 µm, being made up of two 75 µm thick layers.

After the pockets had been filled with the liquid laundry composition, a second film consisting of a similar flattened bubble of Aquafilm LX7D, except that each layer had a thickness of 25 µm producing a total thickness of 50 µm, was placed on top of the filled pockets and sealed at a temperature of 160 to 185° C. at a normal sealing pressure of 352 kPa (51 p.s.i.) and a dwell time of 2.3 seconds.

The heater plate used during the heat sealing softens the two films and the pressure applied by the sealing assembly pushes the films together to laminate them.

Examination of the filled containers produced in all of the above Examples under an optical microscope showed that lamination of the two films in each film stack had occurred. It was possible to see a distinct line or discontinuity between layers demonstrating that individual film integrity was maintained. However, the films could not be separated in normal use, or with a reasonable amount of misuse that might occur in normal use of the product. In particular, it was impossible to peel the two layers apart, thus showing that lamination had taken place.

The invention claimed is:

1. A process for producing a water-soluble container containing a first composition which comprises:
    blowing a flim-forming second composition of poly (vinyl alcohol) to form a bubble;
    collapsing the bubble to form a film stack comprising a plurality of layers;
    thermoforming at a temperature of from 90 to 130°C. and simultaneously laminating the film stack to produce a pocket;
    filling the pocket with the first composition;
    placing a water-soluble film on top of the filled pocket; and
    sealing the films together.

2. A process according to claim 1 wherein the thickness of each film layer in the film stack is 20 to 125 µm.

3. A process according to claim 1 wherein a thermoforming pressure of 60 to 138 KPa or a forming vacuum of 0 to 4 KPa in applied.

4. A process according to claim 1 wherein the film stack consists of two layers.

5. A process according to claim 1 wherein the first composition is a liquid composition.

6. A process according to claim 1 wherein the first composition is a dishwashing, water-softening laundry or detergent composition for a trigger-type spray.

7. A process according to claim 1 wherein the first composition is an agrochemical composition.

8. A process according to claim 3 wherein a forming vacuum of 0 to 4 KPa is applied.

9. A process according to claim 3 wherein a thermoforming pressure of 60 to 130 KPa is applied.

* * * * *